Nov. 6, 1928.                                                                          1,690,684
W. C. JOHNSON
CYLINDRICAL MEMBER AND METHOD OF MAKING THE SAME
Filed July 24, 1924
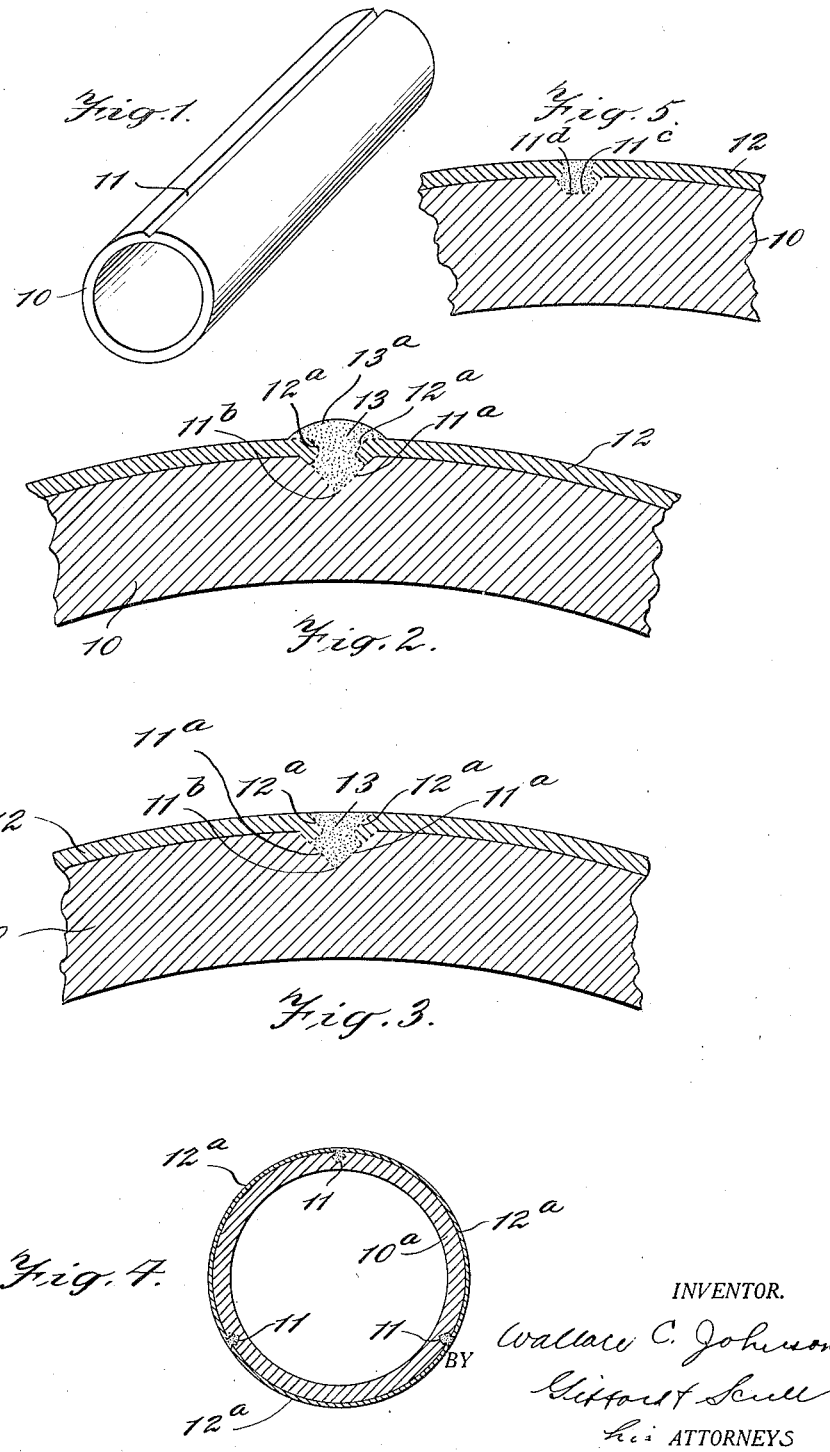

Patented Nov. 6, 1928.

1,690,684

UNITED STATES PATENT OFFICE.

WALLACE C. JOHNSON, OF NEW YORK, N. Y.

CYLINDRICAL MEMBER AND METHOD OF MAKING THE SAME.

Application filed July 24, 1924. Serial No. 728,038.

My invention more particularly relates to a cylindrical member, which is comparatively cheap and simple in construction and which is easily manufactured.

My invention will best be understood by reference to the accompanying drawings, in which I have illustrated the various steps in one method of carrying out my invention, and in which Fig. 1 is a perspective view of a grooved cylinder; Fig. 2 is a fragmentary sectional view illustrating a portion of the grooved cylinder covered with sheet metal, the edges of which are united by welding material; Fig. 3 is a view similar to Fig. 2, illustrating the outer surface of the welding material finished to the surface of the sheet metal; Fig. 4 is a cross sectional view of a modified form of cylindrical member embodying my invention, and Fig. 5 is a view similar to Fig. 1 illustrating a modification.

Like reference characters indicate like parts throughout the drawings.

Referring now to the drawings and first to Figs. 1 to 3, 10 is a cylinder, preferably in the form of a tube having relatively thick walls, and formed of steel or other suitable material, and preferably formed with a single longitudinal groove 11, the sides of which, in the form illustrated, form flat surfaces, as at 11$^a$ and intersecting at 11$^b$. It will, of course, be understood that the inner cylinder may be in the form of a solid cylinder or a hollow cylinder. The cylindrical member 10 is covered with sheet metal 12 preferably having walls relatively thin as compared with those of the inner cylinder, the edges 12$^a$ of which are adjacently located as illustrated in Fig. 2, and opposite the groove 11. The cylindrical outer sheath 12 preferably has a thickness which is not more than $\frac{1}{10}$ of the diameter of the inner tube. Where the cylindrical member is to be used where it is subjected to corrosive action, the sheet metal 12 is preferably formed of a non-corrodible material, such as Monel metal. The edges 12$^a$ of the sheet metal are then bent into the groove 11, as by peening, and the edges thereof are united by welding material 13, which substantially fills the groove 11. Usually, and particularly where the cylindrical member or roll is subjected to corrosive action, destructive action by heat, etc., the welding material preferably has a composition substantially the same as that of the sheet metal, and when the sheet metal is formed of Monel metal, then the welding material is also Monel metal. The welding operation is carried out by an autogenous welding process, such as electric welding. When the process is carried out by electric welding, the welding pencil is deposited along the edges of the sheet metal and in the groove, it being understood that when the welding material is to have substantially the same composition as that of the sheet metal, the welding pencil is formed of that same material, and when the metal sheet is formed of Monel metal, the welding pencil is also composed of Monel metal. The outer surface of the welding material, as at 13$^a$, which protrudes beyond the surface of the sheet metal cylinder 12, is then preferably finished off in a known manner to the outer surface of the sheet metal, and if desired, the entire outer surface may be turned or machined to a true cylinder. Where the cylinder is of considerable length as in the case of boiler tubes or tubes for oil stills, it is impractical to cover the tubes with a single sheet of such material as Monel metal or nickel, as it is not practicable at the present time to make such sheets of a width of more than about four feet. In that case, the cylinder is covered with a plurality of sheets of convenient length placed end to end, and the sheets welded together circumferentially in a known manner, as well as longitudinally as above described.

The welding material 13 which, when applied is, of course, in a highly heated condition, contracts on cooling and serves to draw the sheet metal into firm engagement with the outer surface of the cylinder 10, at the same time the material which fills the groove 11 serves to anchor the sheet metal securely to the cylinder.

Cylindrical members formed in accordance with my invention are useful as rollers in the crushing of certain food products, in dyeing and in textile machinery, in covering tubes used in steam boilers and oil stills to resist the action of the heat to which they are subjected and in other locations. The cylindrical members commonly used for this purpose are formed of tubing, and the outer surface thereof is subjected to corrosion. It is desirable, therefore, to have the outer surface of the cylindrical member of a material which resists such corrosion. Monel metal is well adapted for this purpose. It is impracticable or impossible, however, to draw Monel metal to a thickness suitable for such use. In accordance with my invention, it is not necessary to draw the Monel metal or other material, as the same is prepared from sheet metal which may be made of any desired thickness. Furthermore, by using a covering of sheet metal, which is usually formed of a material more expensive than the base cylinder, the expense of the material in the finished cylinder is greatly reduced.

In Fig. 4, I have illustrated a modified form of my invention in which the base cylinder 10ª is formed with a plurality of grooves 11, and the cylinder is covered with a plurality of sheet metal pieces 12ª, three in the form illustrated, and the edges of which are welded and finished in a manner similar to that described in connection with Figs. 1 to 3. The arrangement shown in Fig. 4 tends to minimize any difficulties that might be encountered because of differences in expansion between the steel tube and the sheet metal sheath, where, for example, steam is passed through the inner tube.

In Fig. 5 I have illustrated a modification of my invention in which the groove 11ᶜ is provided at the lower portion with a flat surface as at 11ᵈ.

I claim:

1. The method of making a cylindrical member which consists in forming a groove longitudinally of a cylinder, covering said cylinder with sheet metal with the edges thereof opposite said groove, bending the edges of the sheet metal into said groove, and welding together the adjacent edges of the sheet.

2. As an article of manufacture, a longitudinally grooved cylinder, sheet metal covering said cylinder and having the edges thereof adjacent said groove united by welding material, the welding material having substantially the same composition as that of said sheet and substantially filling said groove.

3. As an article of manufacture, a longitudinally grooved cylinder, sheet metal covering said cylinder and having the edges thereof bent into said groove and united by welding material, the welding material substantially filling said groove.

WALLACE C. JOHNSON.